United States Patent [19]  [11] 4,394,361
Berkowitz et al.  [45] Jul. 19, 1983

[54] METHOD OF PURIFYING PHOSPHORIC ACID

[75] Inventors: Sidney Berkowitz, Highland Park; Richard A. Mohr, Martinsville, both of N.J.

[73] Assignee: FMC Corporation, Philadelphia, Pa.

[21] Appl. No.: 381,279

[22] Filed: May 24, 1982

[51] Int. Cl.³ .............................................. C01B 25/16
[52] U.S. Cl. ............................. 423/321 S; 423/321 R
[58] Field of Search .................... 423/319, 320, 321 S, 423/321 R, 166, 167

[56] References Cited

U.S. PATENT DOCUMENTS

| | | | |
|---|---|---|---|
| 1,838,431 | 12/1931 | Milligan | 423/320 |
| 1,857,470 | 5/1932 | Milligan | 423/320 |
| 1,929,441 | 10/1933 | Milligan | 23/165 |
| 1,929,442 | 10/1933 | Milligan | 23/165 |
| 1,929,443 | 10/1933 | Milligan | 23/107 |
| 2,859,092 | 11/1958 | Bailes et al. | 23/14.5 |
| 2,860,031 | 11/1958 | Grinstead | 23/14.5 |
| 2,902,454 | 9/1959 | Moore | 252/364 |
| 3,338,674 | 8/1967 | Baniel et al. | 423/321 S |
| 3,410,656 | 11/1968 | Bunin et al. | 423/321 S |
| 3,433,592 | 3/1969 | Baniel et al. | 23/165 |
| 3,708,508 | 1/1973 | Schulz | 252/364 |
| 3,970,741 | 7/1976 | Pavonet | 423/321 S |
| 4,196,180 | 4/1980 | Wojtech et al. | 423/321 S |
| 4,207,302 | 6/1980 | Smith | 423/321 S |
| 4,256,716 | 3/1981 | Sikdar | 423/321 S |
| 4,311,681 | 1/1982 | Chiang et al. | 423/321 S |

Primary Examiner—Gregory A. Heller
Attorney, Agent, or Firm—Robert D. Jackson; Frank Ianno; Eugene G. Seems

[57] ABSTRACT

An organic solvent system, for use in solvent extraction of wet process phosphoric acid, is a mixture of an organic phosphate ester and an essentially water-immiscible organic ketone or alcohol.

12 Claims, No Drawings

METHOD OF PURIFYING PHOSPHORIC ACID

This invention relates to the purification of phosphoric acid by solvent extraction and in particular to a solvent system for effecting said extraction.

It is well-known to upgrade crude or contaminated aqueous phosphoric acid by extracting it with an organic solvent and recovering purified phosphoric acid from the solvent extract. For instance, the technique is widely favored as a means of improving the quality of "wet process" phosphoric acid. This is a familiar commercial phosphate material, the description of which is documented extensively in the prior art and in this connection reference is made to Sauchelli, The Chemistry and Technology of Fertilizers, pp. 197-248, Reinhold Publishing Corp., New York, 1960.

Briefly, the manufacture of wet process phosphoric acid involves the acidulation of phosphate rock, generally having the formula $Ca_{10}F_2(PO_4)_6$, with a mineral acid, commonly sulfuric acid and the resultant wet acid then recovered by filtering it from insolubles in the reaction mixture. Because of the considerable amount of impurities it contains, notably fluorine, calcium, arsenic iron and other metals, wet process acid has relatively limited uses. In fact, almost all of the wet acid produced is consumed by the fertilizer industry where purity is not a primary consideration. A more refined product is called for if it is to be used in the manufacture of high quality chemicals, foods and pharmaceuticals.

Wet process phosphoric acid can, as above pointed out, be purified by solvent extraction. The acid is transferred from the metal contaminated aqueous phase to the solvent medium followed by stripping and recovery of the wet acid from the solvent using water or purified phosphoric solution as the stripping agent. Generally speaking, the solvent is a relatively stable, substantially water-immiscible organic liquid.

Various types of solvents have been suggested and evaluated for extracting wet process acid from acidulated rock solution. These include $C_3$ to $C_8$ aliphatic alcohols, esters, ketones or aldehydes as disclosed in U.S. Pat. Nos. 1,838,431; 1,857,470; 1,929,441; 1,929,442 and 1,929,443. Another class of wet process solvents which have proved useful are the substantially water-immiscible phosphate esters including alkyl, aryl and aralkyl phosphates, tributyl phosphate having been found especially effective.

It is also known to combine phosphate esters with other orgaic liquids to produce mixed solvents which exhibit advantages and benefits not shared by single component solvents. For instance, U.S. Pat. No. 3,970,741 describes the extraction of wet process phosphoric acid with a mixture of isopropyl ether and tributyl phosphate in order to achieve greater solvent action than can be realized with either solvent alone. Although generally effective, the solvent system aforesaid is objectionable in the use of isopropyl ether owing to its extreme flammability and a tendency to generate explosive peroxides. Another example of mixed solvents for wet acid is disclosed in U.S. Pat. No. 4,207,302. According to this document, adding an organic diluent to an organic phosphate results in a solvent composition having two desirable properties—selective extraction of $P_2O_5$ values from sulfate values and prevention of a gelatinous precipitate in the raffinate which interfers with effective separation of organic and aqueous phases. The organic diluent is said to facilitate extraction by lowering the viscosity and density of the organic phase. A list of diluents includes benzene, toluene, xylene, chlorinated benzenes, decahydronaphthalene, low boiling petroleum hydrocarbons such as petroleum naphtha, kerosene and saturated aliphatic hydrocarbons. The problem with these solvent combinations is a tendency for the organic phosphate and diluent to separate from one another as increasing amounts of phosphoric acid are dissolved.

Although considerable advances have manifestly been made in the purification of wet process acid by solvent extraction, there is a need for further improvements and refinements in the technique.

In accordance with the present invention, it has been found that wet process phosphoric acid obtained by acidulation of phosphatic ores can be purified by contacting the wet acid with an organic, essentially water-insoluble liquid extractant consisting essentially of an organic phosphate selected from the group consisting of an alkyl phosphate, an aryl phosphate or an alkyl aryl phosphate diluted with an organic solvent selected from the class consisting of an essentially water-insoluble monohydric aliphatic alcohol and an essentially water-insoluble ketone; recovering an extract lower in impurities than said wet acid; separating said extract from an aqueous raffinate; contacting said extract with sufficient water to strip the $P_2O_5$ values from said extract and forming phosphoric acid, separating an aqueous phosphoric acid solution from the remaining organic extractant, and recovering a phosphoric acid solution higher in purity than the wet acid.

In carrying out the present invention, wet process phosphoric acid, obtained by acidulating a phosphatic ore with sulfuric acid, is preferably treated to remove residual sulfate and fluosilicate impurities remaining in solution in order to expedite subsequent extraction of $P_2O_5$ values. This may be conveniently carried out by adding a sodium salt and calcium salt that are soluble in the acid in order to precipitate calcium sulfate and sodium fluosilicate ($Na_2SiF_6$). The amount of the added sodium and calcium salts will depend upon the concentration of sulfate and fluosilicic acid which remains in the wet acid; the amount of these impurities varies from producer to producer. For convenience sake, sodium carbonate and ground phosphate rock may be employed to provide sodium and calcium values, respectively, because they are readily available and inexpensive. Also, the phosphate rock adds its $P_2O_5$ values to the wet acid.

The resulting sodium fluosilicate and calcium sulfate precipitate is separated from the remaining wet acid and the acid is passed into one or more extraction zones. The acid is introduced preferably into the top of the extraction column and moves countercurrently with the organic extractant of the invention. Desirably the extractant is an alkyl phosphate, an aryl phosphate or an alkyl aryl phosphate that contains no more than about 8 carbon atoms in the aryl or alkyl substituent, diluted with the organic solvent of the invention.

Examples of such alkyl phosphates are tri-n-butylphosphate, triethylphosphate, triisobutylphosphate, diethylhexylphosphate, tris(2-ethylhexyl)phosphate, trioctylphosphate, and ethyl dibutylphosphate. In addition certain alkoxy substituted alkyl phosphates are operative such as tris-butoxyethyl phosphate and are included in the term alkyl phosphate. Examples of aryl phosphates that have been found workable are tricresylphosphate, dicresylxylylphosphate and cresyldiphenylphosphate. The preferred phosphate is tri-n-butylphosphate.

The alkyl or aryl phosphate is diluted with an organic solvent that has limited solubility in water to improve phase separation. The solvent also facilitates extraction by lowering the viscosity and density of the organic phase. Suitable solvents of the invention include monohydric aliphatic alcohols of low water solubility preferably 5 to 15 carbon atoms, for example, 1-pentanol, 2-pentanol, 1-hexanol, 3-heptanol, 2-heptanol, 1-octanol, 3-nonanol, 1-decanol, 1-dodecanol, etc; also useful as diluents are water-insoluble or essentially water-insoluble ketones, preferably of 5 to 20 carbon atoms, for example, 3-pentanone, 2-hexanone, 3-hexanone, 2-heptanone, 2-octanone, 3-octanone, 2-nonanone, diisobutyl ketone, acetophenone, benzophenone, methyl α-naphthyl ketone, etc. The volume ratio of organic phosphate to solvent may be from 20:1 to 0.5:1 with a ratio of 3:1 being preferred.

The volume ratio of organic extraction to wet acid can vary from about 1:1 to about 10:1 to extract no more than 85% and preferably from 50–85% of the $P_2O_5$ values of the wet acid. However, sulfuric acid injection can increase the yield of $P_2O_5$ up to about 95%. The volume ratio selected must not extract more than 85% of the $P_2O_5$ values present in the wet acid to avoid the formation of a gelatinous mass in the raffinate during the extraction step. A preferred volume ratio is about 4:1.

In the extracting stage of the process up to about 85% of the $P_2O_5$ values present in the wet acid are loaded into the organic extract leaving behind the bulk of the mineral impurities in the raffinate. This extraction step can be carried out in any suitable extraction device such as mixer-settlers, agitated columns, liquid-liquid centrifugal contractors and the like. The resultant raffinate which contains unextracted $P_2O_5$ values and mineral impurities in an aqueous solution can be used in producing fertilizer, for example, triple superphosphate thereby utilizing unextracted $P_2O_5$ values. The extraction step is normally carried out at temperatures of from 20°–60° C. for best results; room temperatures can be employed for ease of operation.

The organic extract is then preferably passed to a scrubber unit where it is scrubbed with water or an aqueous phosphoric acid of greater purity than the wet acid; product acid or aqueous $H_3PO_4$ from the stripper (as defined hereinafter) is normally used for this purpose. In this step a large portion of the iron and other metal impurities can be removed from the organic extract if present. The volume ratio of organic extract to phosphoric acid can be from 10:1 to about 60:1 with about 40:1 being preferred. In this operation, enough acid is added to the organic extract to remove the mineral impurities in the organic extract below any required level. For example, enough phosphoric acid may be added to reduce the iron level below a ratio of iron to $P_2O_5$ of about 1:5000. The exact amount of acid used will vary depending upon the initial impurity level of organic extract. This scrubbing step can be carried out in the same type of equipment specified for the extraction step and is preferably carried out at a temperature of 20°–60° C.; ambient room temperatures can be employed, if desired, for ease of operation. If the metal impurity level is sufficiently low, this step can be eliminated.

The concentration of phosphoric acid used for scrubbing is normally about the same as the concentration of the purified acid product in order that it be close to equilibrium with the $P_2O_5$ values in the organic extract. In this way small amounts of $P_2O_5$ values are transferred between the organic phase and the scrubbing phosphoric acid; this is the preferred mode of operation in continuous processing.

The scrubbed organic extractant is then passed into a stripping column and stripped of its $P_2O_5$ values by contacting it with water. Enough water is added to remove substantially all of the $P_2O_5$ values present in the scrubbed organic extractant. If desired, the water used for stripping the $P_2O_5$ values may contain salts such as alkali metal carbonates or hydroxides to facilitate the stripping. In general, it is not desirable to remove the last traces of $P_2O_5$ from the scrubbed organic extractant since this would necessitate using excessive amounts of water and would result in unnecessary dilution of the resultant aqueous acid extract. Good results have been obtained with volume ratios of scrubbed organic extractant to water of from 0.5:1 to 12:1, the exact ratio depending on the amount of $P_2O_5$ in the scrubbed organic extractant and on whether water or a basic solution is used for stripping. The stripping is preferably carried out at temperatures of from 20°–60° C.; ambient room temperatures can be employed for ease of operation if desired.

After the stripping operation has been completed, the aqueous phosphoric acid extract which is recovered contains substantially all $P_2O_5$ values extracted from the wet acid feed. The stripped organic extracting solution exiting from the stripping column may be purified, for example, by treatment with activated charcoal, an alkali wash, and/or distillation to remove soluble impurities, and is recycled for further extraction.

The resultant aqueous phosphoric acid extract may contain fluorine impurities. These may be removed, if present, by heating the extract to a temperature of from 25°–150° C., so that it boils and expels fluorine values from the solution. The exact boiling temperature depends on the concentration of $P_2O_5$ values in the solution. During this operation, substantially all the fluorine values except trace amounts are removed. This heating stage may be a mere refluxing of the acid solution or the solution may be concentrated by allowing water vapor to escape from the system. The resultant phosphoric acid is then recovered as a purified acid, having a much higher purity level than wet acid.

In a few instances, the resulting aqueous acid product may have a slight color due to the presence of minute amounts of residual organic impurities. These impurities can be removed when required by contacting the product acid with charcoal and adsorbing the impurities on the charcoal. The resultant acid will then be water-white with no trace of color.

The invention is illustrated by the following non-limiting examples.

EXAMPLE 1

Extraction devices containing one theoretical stage were simulated in the laboratory using separatory funnels to show the improvement attainable when the diluent used with tributyl phosphate (TBP) is changed from kerosene of the prior art to diisobutyl ketone (DIBK) of the invention at room temperature for various concentrations of a feed of furnace grade phosphoric acid. Ten grams of feed acid were extracted with 15 grams of solvent, and the results are compared below. Solvent compositions are percent by volume, and acid concentrations are percent by weight.

| Feed Acid (% $H_3PO_4$) | 75% TBP + 25% Kerosene* | | 75% TBP + 25% DIBK | |
|---|---|---|---|---|
| | Extract (% $H_3PO_4$) | Raffinate (% $H_3PO_4$) | Extract (% $H_3PO_4$) | Raffinate (% $H_3PO_4$) |
| 5 | 0.14 | 4.9 | 0.52 | 4.9 |
| 25 | 0.70 | 25.0 | 4.41 | 22.8 |
| 35 | 1.22 | 33.8 | 9.06 | 29.6 |
| 70 | 13.3 | 64.3 | 21.6 | 58.8 |

*Prior Art: U.S. Pat. No. 3,410,656

These simulations illustrate the substantial increase in phosphoric acid concentration which is attainable in the extract by merely changing the tributyl phosphate diluent from kerosene to diisobutyl ketone. A much smaller extraction device would be possible with this ketone diluent than with kerosene. An additional result of these laboratory tests was the unexpected rapidity of phase separation for the ketone system after the two feeds were agitated and allowed to settle by gravity.

EXAMPLE 2

In an illustration of the high loading of the solvent with phosphoric acid, 21 grams of 85% furnace acid was agitated at room temperature with 25 grams of solvent composed of 75% w/w tributyl phosphate and 25% w/w diisobutyl ketone. After settling, the phosphoric acid concentration in the extract was 31.2% w/w, which is well above the practical maximum attainable in the kerosene system of the prior art without at least partial separation of the kerosene and tributyl phosphate.

EXAMPLE 3

Back-extracting devices operating at elevated temperature and containing one theoretical stage were simulated in the laboratory using separatory funnels to show the improvement attainable for back-extracting to produce phosphoric acid at a higher temperature than the extraction step. Quantities and concentrations are as in Example 1, and all solvents are 75% tributyl phosphate plus 25% diisobutyl ketone.

| Feed Acid (% $H_3PO_4$) | Room Temperature (Ex. 1) | | 55° C. | |
|---|---|---|---|---|
| | Solvent (% $H_3PO_4$) | Product Acid (% $H_3PO_4$) | Solvent (% $H_3PO_4$) | Product Acid (% $H_3PO_4$) |
| 5 | 0.52 | 4.9 | 0.80 | 5.29 |
| 25 | 4.41 | 22.8 | 2.24 | 25.24 |
| 35 | 9.06 | 29.6 | 4.19 | 33.02 |
| 70 | 21.6 | 58.8 | 22.23 | 61.25 |

It will be observed from the data aforesaid that the slightly higher phosphoric acid concentrations in the product acid samples would represent a modest improvement, by permitting higher product acid concentrations in a slightly fewer number of theoretical steps than back-extracting at room temperature.

EXAMPLE 4

To illustrate the wide range of solvent compositions which are potentially useful, the test procedure of Example 2 was repeated for solvents containing varying concentrations of tributyl phosphate and diisobutyl ketone. The results are summarized below.

| Feed Acid (% $H_3PO_4$) | 100 TBP/0 DIBK | | 90 TBK/10 DIBK | |
|---|---|---|---|---|
| | Extract (% $H_3PO_4$) | Raffinate ($H_3PO_4$) | Extract (% $H_3PO_4$) | Raffinate (% $H_3PO_4$) |
| 85 | 34.7 | 75.5 | 33.8 | 75.5 |

| 75 TBP/25 DIBK | | 50 TBP/50 DIBK | |
|---|---|---|---|
| Extract (% $H_3PO_4$) | Raffinate (% $H_3PO_4$) | Extract (% $H_3PO_4$) | Raffinate (% $H_3PO_4$) |
| 31.2 | 74.7 | 31.4 | 76.8 |

During these experiments, the diluted solvent phase was observed to separate more rapidly from the aqueous acid phase than when undiluted tributyl phosphate was used as the solvent.

EXAMPLE 5

Two experiments simulating a process containing a one-stage extractor and a one-stage back-extractor were performed in order to demonstrate the surprising ease with which the extract containing phosphoric acid can be back-extracted with a basic solution. In one experiment, 21 grams of 85% furnace phosphoric acid was extracted with 25 grams of a solvent containing 75% w/w tributyl phosphate and 25% w/w benzophenone. The extract was back-extracted with 19.8 grams of an aqueous 20% w/w sodium hydroxide solution to yield a stripped solvent phase containing 1.01% phosphoric acid and an aqueous sodium phosphate phase containing phosphate salts reported as 40.2% $NaH_2PO_4$.

The same experiment was repeated, but using diisobutyl ketone in place of the benzophenone, the extract, 37.87 grams containing 31.2% phosphoric acid was back-extracted with 23.45 grams of 20% w/w sodium hydroxide solution to yield a stripped solvent phase containing 0.28% phosphoric acid and an aqueous sodium phosphate containing phosphate salts reported as 40.5% $NaH_2PO_4$.

EXAMPLE 6

Other alcohols and ketones can be used in practicing the invention as shown from the results given in Table I. Although there is some scatter in the data, all three diluents provide approximately equal solvent power, and all are considerably superior to kerosene.

TABLE I

| Diluent: | None | | Diisobutyl Ketone | | Acetophenone | | Benzophenone | | 3-Octanone | | n-Octanol | | n-Decanol | |
|---|---|---|---|---|---|---|---|---|---|---|---|---|---|---|
| % Tributyl Phosphate: | 100 | | 75 | | 75 | | 75 | | 75 | | 75 | | 75 | |
| % Diluent: | 0 | | 25 | | 25 | | 25 | | 25 | | 25 | | 25 | |
| | (% $H_3PO_4$) | | (% $H_3PO_4$) | | (% $H_3PO_4$) | | (% $H_3PO_4$) | | (% $H_3PO_4$) | | (% $H_3PO_4$) | | (% $H_3PO_4$) | |
| | Extract | Raffinate | Extract | Raffinate | Extract | Raffinate | Extract | Raffinate | Extract | Raffinate | Extract | Raffinate | Extract | Raffinate |
| | 0.58 | 5.1 | 0.52 | 4.9 | 0.98 | 4.9 | 1.02 | 4.9 | 0.35 | 5.19 | 0.30 | 4.99 | 0.33 | 5.10 |
| | 2.9 | 18.5 | 4.41 | 22.8 | 6.23 | 22.3 | 6.37 | 22.5 | 3.02 | 20.1 | 2.56 | 20.7 | 2.63 | 20.3 |
| | | | 9.06 | 29.6 | 7.35 | 30.4 | 10.8 | 23.5 | | | | | | |

TABLE I-continued

| Diluent: | None | | Diisobutyl Ketone | | Acetophenone | | Benzophenone | | 3-Octanone | | n-Octanol | | n-Decanol | |
|---|---|---|---|---|---|---|---|---|---|---|---|---|---|---|
| % Tributyl Phosphate: | 100 | | 75 | | 75 | | 75 | | 75 | | 75 | | 75 | |
| % Diluent: | 0 | | 25 | | 25 | | 25 | | 25 | | 25 | | 25 | |
| | (% H$_3$PO$_4$) | | (% H$_3$PO$_4$) | | (% H$_3$PO$_4$) | | (% H$_3$PO$_4$) | | (% H$_3$PO$_4$) | | (% H$_3$PO$_4$) | | (% H$_3$PO$_4$) | |
| | Extract | Raffinate | Extract | Raffinate | Extract | Raffinate | Extract | Raffinate | Extract | Raffinate | Extract | Raffinate | Extract | Raffinate |
| | 23.6 | 58.8 | 21.6 | 58.8 | 20.1 | 58.3 | 24.3 | 59.3 | 19.9 | 60.9 | 22.3 | 59.3 | 21.4 | 59.7 |
| | 34.7 | 75.5 | 31.2 | 74.7 | | | | | 35.0 | 74.7 | 35.2 | 74.3 | 35.7 | 74.6 |

What is claimed is:

1. In the purification of wet process phosphoric acid by the solvent extraction of sulfuric acid acidulated phosphatic ores wherein there is formed an aqueous phase containing the major part of the impurities and a solvent phase containing purified phosphoric acid and separating both said phases, and recovering the phosphoric acid the improvement which comprises extracting the phosphoric acid with an organic, essentially water-insoluble liquid extractant consisting essentially of an organic phosphate selected from the group consisting of an alkyl phosphate, an aryl phosphate or an alkyl aryl phosphate diluted with an organic solvent selected from the class consisting of diisobutyl ketone, acetophenone, benzophenone, 3-octanone, 1-octanol and 1-decanol.

2. Process of claim 1 wherein the extract which is separated from the aqueous phase is scrubbed with an aqueous phosphoric acid of a greater purity than said wet acid thereby reducing the impurity level of said extract, separating a scrubbed extract from the scrubbing phosphoric acid, contacting said scrubbed extract with water in amounts sufficient to strip the P$_2$O$_5$ values therefrom and forming phosphoric acid, separating an aqueous phosphoric acid solution from the remaining organic extractant and recovering as a product a phosphoric acid solution having a higher purity than said wet acid.

3. Process of claim 1 wherein said organic phosphate and said organic solvent are present in said extractant in a volume ratio of said extractant to wet acid feed from 1:1 to 10:1.

4. Process of claim 1 wherein the volume ratio of said organic phosphate to said organic solvent in said extractant is 3:1 and wherein the volume ratio of said extractant to wet acid is 4:1.

5. Process of claim 1 wherein the organic phosphate is tributyl phosphate.

6. Process of claim 4 wherein the organic solvent is diisobutyl ketone.

7. Process of claim 1 wherein the final phosphoric acid solution is treated with charcoal and a phosphoric acid product is recovered which is water-white.

8. Process of claim 2 wherein the volume ratio of said organic phosphate and said organic solvent in said extractant is from 20:1 to 0.5:1 and the volume ratio of said extractant to wet acid is from 1:1 to 10:1, said organic extractant is scrubbed with said aqueous phosphoric acid in a volume ratio of from 10:1 to 60:1, and said scrubbed organic extractant is stripped with water in a volume ratio of 4:1 to 12:1.

9. Process of claim 1 wherein said wet acid is first treated prior to extraction with said organic extractant by adding a calcium salt and a sodium salt that are soluble therein to precipitate sodium fluosilicate and calcium sulfate, the precipitate is separated from the supernatant acid, and said supernatant acid is subsequently contacted with said organic extractant.

10. Process of claim 1 wherein said aqueous phosphoric acid separated from said remaining organic extractant is heated to a temperature of from 110° to 150° C. to vaporize any fluorine values therein prior to recovering the phosphoric acid solution as a final product.

11. Process of claim 1 wherein from 50–95% of the P$_2$O$_5$ values present in said wet acid are extracted by said organic extractant.

12. The process of claim 2 wherein sulfuric acid injection is used to increase yield of extractable P$_2$O$_5$ values.

* * * * *